Oct. 19, 1965
G. L. LUNDBERG
3,212,200
GEAR DEVICE TO STIMULATE INTEREST IN MATHEMATICS
Filed Sept. 16, 1963
3 Sheets-Sheet 1
FIG__1
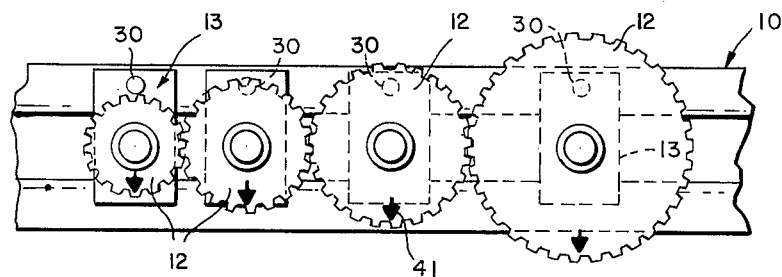
FIG__2
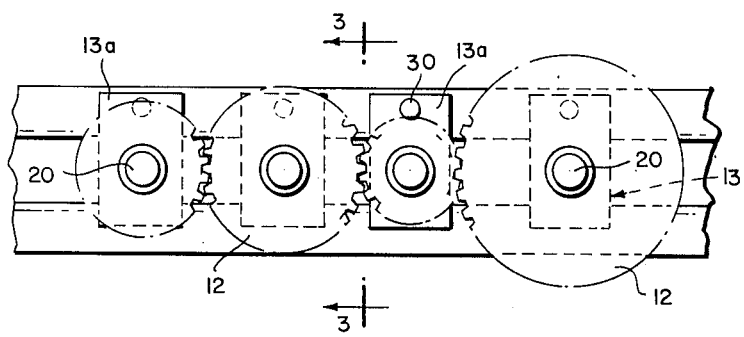
FIG__3
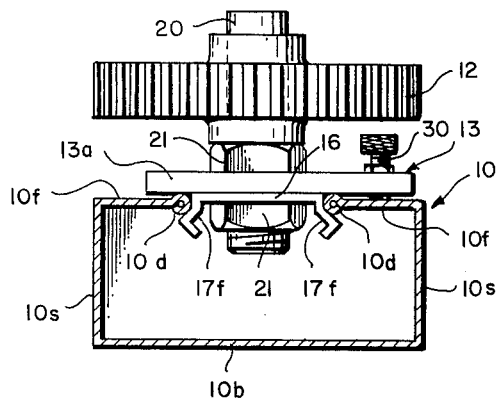
FIG__3A
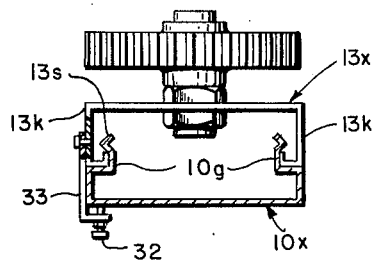
GEORGE L. LUNDBERG
INVENTOR.
BY Seed & Berry
ATTORNEYS Oct. 19, 1965 G. L. LUNDBERG 3,212,200
GEAR DEVICE TO STIMULATE INTEREST IN MATHEMATICS
Filed Sept. 16, 1963 3 Sheets-Sheet 2
FIG___4
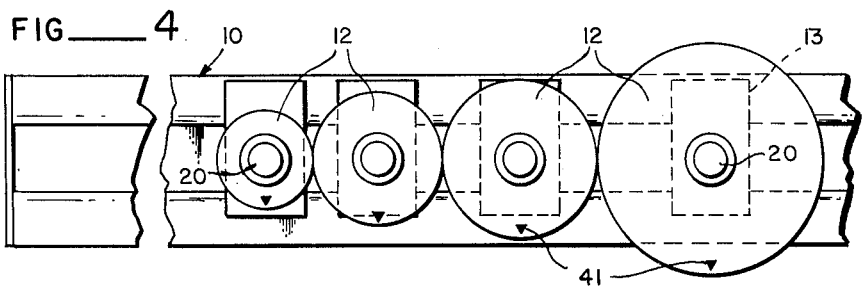
FIG___5
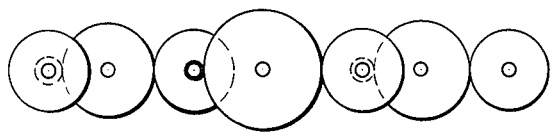
FIG___6 FIG___7
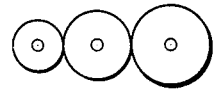 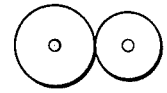
FIG___8
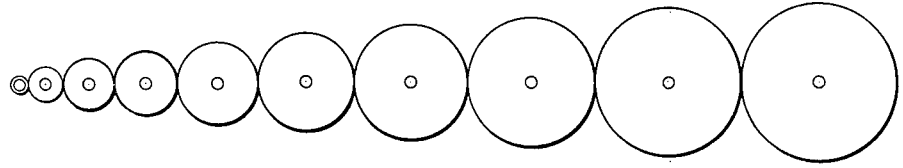
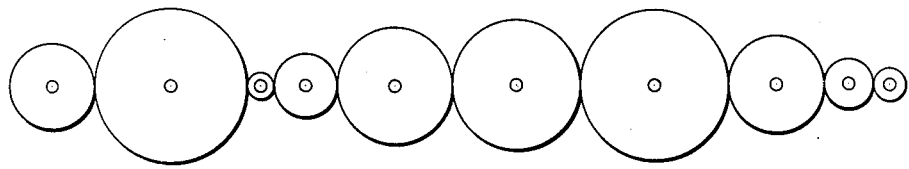
FIG___9
GEORGE L. LUNDBERG
*INVENTOR.*
BY Seed & Berry
*ATTORNEYS*

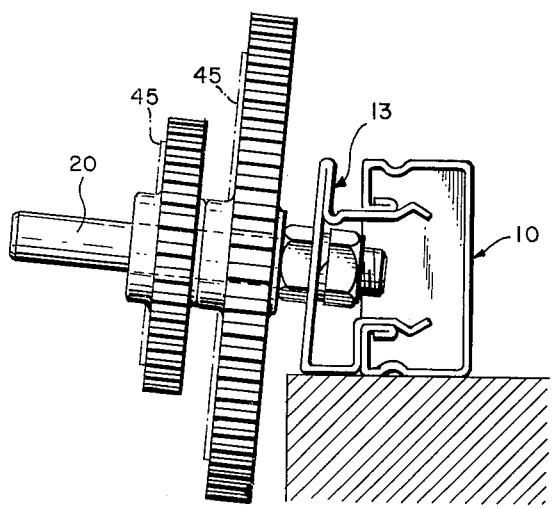
FIG.\_\_10
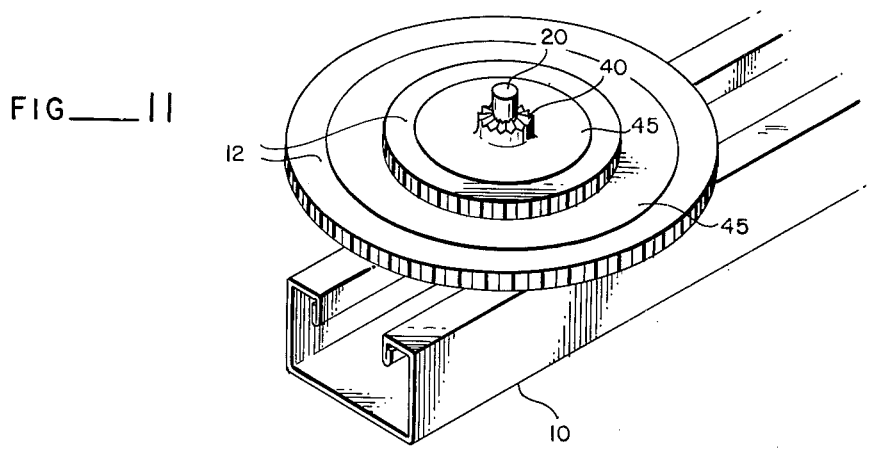
FIG.\_\_11
FIG.\_\_12
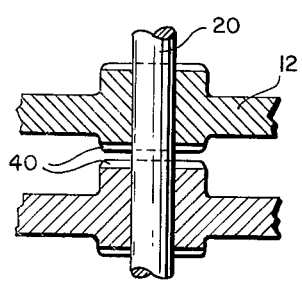
GEORGE L. LUNDBERG
INVENTOR.
BY *Seed & Berry*
ATTORNEYS

United States Patent Office 3,212,200
Patented Oct. 19, 1965

3,212,200
GEAR DEVICE TO STIMULATE INTEREST
IN MATHEMATICS
George L. Lundberg, P.O. Box 194, Issaquah, Wash.
Filed Sept. 16, 1963, Ser. No. 309,168
4 Claims. (Cl. 35—13)

This invention relates to educational novelties. More particularly, it pertains to a device or novelty that is designed for use as a means of stimulating the interest of school children, students and others, in the solving and demonstrating of various mathematical and geometrical problems and theorems.

It is one of the principal objects of this invention to provide a simple, easy to use and relatively inexpensive device of the above stated character that may be employed to solve and visually demonstrate certain basic fundamentals of addition, subtraction, division and multiplication; that in its use utilizes the relative movement of intermeshing, toothed gears or interengaged friction discs, or the like, for the demonstrating and explaining of various gear movements, problems of geometry and mathematics.

More specifically stated, the principal objects of the invention reside in the provision of a device including a base member designed for the mounting thereon of a succession of intermeshing gears of various predetermined diameters in such manner that the manual rotative advancement of any one gear will effect an equal lineal rotative advancement of all others; said gears being mounted on said base by means of clips that permit them to be interchanged in their order in the succession of gears in any of their various possible assemblages.

It is also an object of this invention to design a gear mounting base member of a novel and practical formation, and to equip each gear with a mounting clip or glide for the easy and ready mounting of the gear on said base member to provide for the interchange of gears in any succession that may be assembled for use.

Still further objects and advantages of the invention reside in the details of construction and combinations of the various parts involved in the device, and in their methods of use as will hereinafter be described.

In accomplishing the above mentioned and other objects that will become apparent as this specification progresses, I have provided the improved details of construction, the preferred forms of which are illustrated in the accompanying drawings, wherein FIG. 1 is a plan or top view of a novelty device embodied by the present invention, showing one order in the arrangement of a succession of four intermeshing toothed gears as mounted by dis-mountable clips on a supporting base member that is formed in accordance with the present invention.

FIG. 2 is a plan or top view of the device as shown in FIG. 1, but with the several gears applied to the base member in a different order.

FIG. 3 is an enlarged cross-sectional view, taken on line 3—3 of FIG. 2, showing one formation of the gear mounting base and one formation of the gear mounting clip which is applied to the base.

FIG. 3A is a view similar to FIG. 3, but showing alternative formations for the base member and gear mounting clip.

FIG. 4 is a plan view of the device, showing friction discs used in lieu of toothed gears and as mounted on the base member for demonstrating their use.

FIGURES 5 through 9 illustrate different arrangements of gears or friction discs for explanations or demonstrations of various kinds.

FIG. 10 is an end view of the present device with two gears mounted on a spindle that extends at an upward inclination.

FIG. 11 is a perspective view showing an arrangement of two gears on an upwardly directed spindle.

FIG. 12 is a fragmental sectional showing of the two gears of FIGURES 10 and 11.

It is not the intent that this application shall disclose or discuss all possible uses of the present device or that it shall disclose all variations in the formation or construction of the base member and the gear mounting clips or glides as applied thereto. Neither will it attempt to illustrate all possible orders in arrangement, of toothed gears or friction discs as used for demonstrations, explanations or teachings. Only some of the simplest arrangements or combinations will be given herein and explained to show the use of the device and to establish the claims that are to be made therefor.

While it is most practical to employ toothed gears in this device, because in their use, there can be no slippage between their engaged surfaces, it is also possible to employ friction discs in a like manner with a satisfactory degree of success. It is to be here pointed out, that in the use of friction discs, the lines defining their contacting circumferences correspond to the pitch circles of the teeth of intermeshing toothed gears used in a like manner. In this specification, toothed gears and friction discs will both be referred to as "gears" since each, as herein shown, serve in the same way as the other, and the same results may be attained by the use of either.

Referring more in detail to the drawings:

In the device as shown more particularly in FIGS. 1 through 4, reference numeral 10 designates, in its entirety, what will herein be referred to as the gear mounting base member on which a succession of toothed gears 12 as featured in FIGS. 1, 2 and 3, or friction discs as shown in FIGS. 5 through 9 may be mounted in various orders and in various numbers. The base member 10, as presently preferred and as shown best in FIG. 3 is of sheet metal and of channel-like formation in cross section and may be made in various and substantial lengths. The base member as shown in FIG. 3 is seen to comprise a flat bottom wall 10b, from which opposite side walls 10s—10s are upturned to a suitable height to extend in parallel relationship to the full length of the member. At their top edges these side walls have inturned flanges 10f—10f which terminate at their adjacent edges in rounded beads 10d—10d; these beads being at the same horizontal level and in spaced, parallel relationship and serve together as rails of a trackway.

Each of the toothed gears 12 to be used herein is equipped with a mounting clip or glide 13, which may be made as shown in FIG. 3 for its ready application to and removal from the base 10, for the securement and mounting of the gears in base 10 in horizontal alignment and also for their adjustment into their desired intermeshing relationship as in FIGS. 1 and 2. All clips or glides 13 as seen in FIGS. 1, 2, 3 and 4 are alike and are designed for their easy application to or removal from the base member 10 for ready interchange in their order of application.

Each clip 13 is seen in FIG. 3 to comprise a stiff, flat metal top plate 13a of a length sufficient to extend across the base member and to rest upon the parallel beads 10d—10d thereof for easy sliding support thereon. Disposed flatly against the under face of the plate 13a is a flat clip securing plate 16 of relatively thin and quite resilient metal, or the like, which plate has downwardly turned and angularly formed end flanges 17f—17f that are adapted to be pressed downwardly between the parallel beads and their lower outwardly shouldered end portions caused to be snapped beneath the beads thus to yieldingly secure the clip for its gear holding and sliding adjustment along the base 10. However, by pulling upwardly on the clip, its end flanges 17f will yield inwardly and disengage their shouldered ends from the beads 10d so that the particular gear that is mounted by any clip may be removed and interchanged with any other or it may be left removed from the succession of gears if that is desired.

Each clip 13 mounts a vertical spindle 20 centrally thereon; the spindle having at its lower end portion applied centrally through the two plates 13a and 16 are secured by nuts 21—21 threaded thereon as shown and tightened against the plates. Above the plate 13a, the spindle 20 mounts a gear 12 freely rotatable thereon. All clip mounted gears are supported on the base at the same level for intermeshing or interengaging.

In assembling the parts of the device for use, the base 10 may be first placed upon a support as in FIG. 3, and then the selected gears 12 are applied thereto in any desired succession or order, as has been herein illustrated in the several views. Ordinarily, the clips 13 properly applied to the base, will grip the beads and will hold the gears in proper mesh when they are pushed together. However, if it is desired, each clip may be equipped, as shown in FIGS. 1, 2 and 3, with a holding set screw or bolt 30 that is threaded through one end of the spindle mounting plate 13a for tightening its inner end against an inturned flange 10f of the base, thus to secure the clip against slippage.

It is readily apparent that the formation of the base 10 may be changed in various ways without departing from the spirit of the invention, as also may be the details of formation of the gear mounting clips 13, as shown in FIG. 3A; it being the intent that this device shall employ a base member 10 to which a succession of gears 12 or friction discs may be readily applied and adjusted into and from intermeshed relationship if toothed, or into and from frictional contact, if they are frictional gears, and that the clips 13 may or may not be equipped with locking or clamp screws, depending on desires or requirements.

In the showing of parts in FIG. 3A, the base member therein designated by numeral 10x, comprises a flat bottom plate which is formed with upstanding, longitudinally extending yieldable flanges 10g—10g in laterally spaced relationship.

The gear mounting glide 13x applied thereto is of inverted channel form with downwardly and inwardly turned end flanges 13k—13k that may be pressed down over and snapped beneath the shouldered ends 13s—13s of the flanges to yieldingly hold the clip in position. In this modification, a gear mounting spindle 20 is mounted on the clip, as before described and each clip may be provided with a securing set screw 32 that is threaded through an arm 33, that extends downwardly from the end of the clip, for tightening against the base plate.

The spindles 20, regardless of the formation of the base member or of the clips, provide for the easy slipping of the gears thereon or their removal therefrom and also permit free and easy rotation of gears on their spindles.

It has been found desirable that the gear mounting spindles shall be set on their clips at a slight angle relative to a perpendicular or horizontal line, in order that the tendency of the gears, when rotated, will be to maintain their intermeshed relationship. Such angling of the spindles has been shown in FIG. 10 wherein it is observed that the channel base 10 has been so turned that it opens laterally and the clip 13 is so formed that the spindle 20 is held in an upwardly inclined direction. This clip also may be equipped with a set screw to insure more stability and a fixed position of adjustment.

This upward inclination as effected in FIG. 10 by this clip formation would result in a lateral leaning of the spindle, if the base was turned to the upright position of that of FIG. 3. The leaning of the spindles may apply to their mounting on clips of various formations, but is most desirable when the base is turned as shown in FIG. 10.

For various demonstrations or explanations, two or more gears may be applied, as in FIG. 10, to the same spindle. When used in this relationship, it is desired that they be interlocked to turn in unison, and to accomplish this interlocking, I have provided the opposite end faces of the gear hubs with radial grooves or serrations, as shown at 40 in FIGS. 11 and 12.

It is also desirable, in the making of any demonstration by means of the intermeshed gears or engaged friction discs, that marking means be applied to their peripheral portion as has been shown at 41 in FIGS. 1 and 4. These marking means, presently being used, are small pieces of adhesive tape, because it is readily removable for change in its place of application, if necessary or desired.

In the setting of any order of gears of discs preparatory to a demonstration, these tabs or marking means 41 set at a predetermined position, usually at the bottom of all gears or at the top.

Instead of applying tabs 41, easily removed chalk marks may be used as markers with like results. Also, for various demonstrations, especially when gears are used as mounted in FIGS. 10 and 11, paper discs 45 may be applied about the gear hubs between gear faces and these discs may be rotatably adjusted and marked in various ways as required for any specific explanations.

In order to demonstrate the use of the gears as shown in FIG. 1 to solve a problem in division, we can assume that the smallest gear has a diameter of 2″ and the largest a diameter of 4″. To find the answer to the problem 4 divided by 2, the smallest gear is rotated as many times as required to turn the largest gear one complete turn of 360°. In this instance, the answer would be 2.

If we assume the first gear to be 2″ in diameter, and the third gear 5″ in diameter, then to similarly find the answer to the problem 5 divided by 2, the smaller gear would be rotated 2½ times to make one 360° turn of the five inch gear.

If we assume the four gears of FIG. 1 to be 3″, 4″ and 5″ and 7″ in diameter, the 3″ gear would have to be rotated 140 times in order to rotate all gears and bring them back to their original relationship. Thereby, the 4″ gear would rotate 105 times, the 5″ gear would rotate 84 times and the 7″ gear would rotate 60 times.

If we assume the set of four intermeshed gears of FIG. 1 are 3″, 4″, 5″ and 6″ in diameter, and are rotated from the FIG. 1 setting until all tabs 41 will again be brought to the original position, the common multiple of all gears will be 60.

$$(4 \times 15) = (3 \times 20) = (5 \times 12) = (6 \times 10)$$

By a countermovement of gears an equation appears (assuming the backward motion of the gears is 10 teeth, each will move that many teeth in unison) creating an equation of $$(3 \times 20) - 10 = (4 \times 15) - 10$$
$$= (5 \times 12) - 10 = (6 \times 10) - 10$$

A different equation appears by continuing in the same forward motion after reaching the common multiple of 60 by adding a turn of 10 teeth in the same direction.

$$(3 \times 20) + 10 = (4 \times 15) + 10$$
$$= (5 \times 12) + 10 = (6 \times 10) + 10$$

This leads to equations using positive and negative numbers.

If we assume the gears of FIG. 2 are 4″, 5″, 3″ and 8″ in diameter: The 360° rotation of the 4″ gear will rotate the 5″ gear $\frac{4}{5}$ of its circumference and the 3″ gear $\frac{4}{3}$ of its circumference and the 8″ gear $\frac{4}{8}$ of its circumference. Thereby setting up an equation of $$\frac{4}{5} \times \frac{5}{3} \times \frac{3}{8} = \frac{4}{8}$$

which shows the direct relationship of the first gear (4")
to the fourth gear (8") of a ratio of 4 to 8 by accurate
movement of the intermeshing gears.

Using 20 teeth per inch of diameter on the gears and
assuming the gears are 1", 4", 5" and 10" respectively;
the ratio relation of the gears becomes $$\frac{1}{4} \times \frac{4}{5} \times \frac{5}{10}$$

One 360° turn of the 1" gear creates a rotation of ¼
turn of the 4" gear or 20 teeth (¼ of 80); ⅕ rotation
of the 5" gear or 20 teeth (⅕ of 100); and ¹⁄₁₀ rotation
of the 10" gear or 20 teeth (¹⁄₁₀ of 200).

Various other demonstrations may be carried out by
the gear arrangements herein shown but are not herein
explained since the claims are thought to reside in the
mounting base, the glides and gears as mounted by said
glide on the bar, as set forth in the following claims.

While I have herein indicated various parts as being
composed of metal, it is to be understood that various
materials, such as plastics or other suitable known materials, may be used.

This applies also to the making of the various gears
used in the assembly and to the base member on which
they are mounted; it being desirable to keep weight
down as much as possible without detriment to strength
and utility.

I claim:

1. A visual demonstrating and teaching device comprising a mounting base member of channel formation and
having opposite side walls extending therealong in parallel
relationship and formed along their top edges with inturned flanges, with beaded edges in parallel relationship,
glides adapted for removable, holding application to said
beaded edges and for sliding adjustment therealong, a
spindle mounted by each glide, a gear mounted rotatably
by each spindle; each of said gears having a reference
mark at its edge and all gears are movable on said base
into intermeshed relationship, whereby the manual turning of any one of them with reference to a starting reference mark effects turning all others to an equal extent.

2. The combination recited in claim 1 wherein each
glide has securing flanges extending downwardly therefrom for reception between said parallel beaded edges
of the base member to yieldingly hold the glide at any
position of its adjustment on said base member.

3. A combination according to claim 2 wherein each
glide mounts a set screw adapted to be adjusted into
holding contact with the base member to maintain the adjustment of the glide.

4. A device according to claim 2 wherein a reference
disc is applied to a face of each of the gears, and is
rotatably adjustable thereon, said discs having reference
marks thereon and being rotatably adjustable about the
gear axis.

References Cited by the Examiner

UNITED STATES PATENTS

| | | | |
|---|---|---|---|
| 1,297,462 | 3/19 | Hallenbeck | 74—352 X |
| 2,095,046 | 10/37 | Wilner | 35—13 X |
| 2,692,443 | 10/54 | Milligan | 35—13 |

EUGENE R. CAPOZIO, *Primary Examiner.*

LAWRENCE CHARLES, *Examiner.*